United States Patent
Abe

(10) Patent No.: US 10,576,786 B2
(45) Date of Patent: Mar. 3, 2020

(54) NON-PNEUMATIC TIRE

(71) Applicant: BRIDGESTONE CORPORATION, Tokyo (JP)

(72) Inventor: Akihiko Abe, Tokyo (JP)

(73) Assignee: BRIDGESTONE CORPORATION, Chuo-ku, Tokyo (JP)

(*) Notice: Subject to any disclaimer, the term of this patent is extended or adjusted under 35 U.S.C. 154(b) by 184 days.

(21) Appl. No.: 15/033,942

(22) PCT Filed: Oct. 24, 2014

(86) PCT No.: PCT/JP2014/078392
§ 371 (c)(1),
(2) Date: May 3, 2016

(87) PCT Pub. No.: WO2015/072314
PCT Pub. Date: May 21, 2015

(65) Prior Publication Data
US 2016/0272006 A1 Sep. 22, 2016

(30) Foreign Application Priority Data

Nov. 15, 2013 (JP) .................... 2013-236914

(51) Int. Cl.
*B60C 7/14* (2006.01)
*B60C 7/18* (2006.01)
(Continued)

(52) U.S. Cl.
CPC .............. *B60C 7/18* (2013.01); *B60B 9/04* (2013.01); *B60B 9/26* (2013.01); *B60C 7/14* (2013.01);
(Continued)

(58) Field of Classification Search
CPC .... B60B 9/00; B60B 9/02; B60B 9/04; B60B 9/26; B60C 7/14; B60C 7/18; B60C 2007/146
See application file for complete search history.

(56) References Cited

U.S. PATENT DOCUMENTS

| | | | |
|---|---|---|---|
| 976,938 | A | 11/1910 | Simpson |
| 1,263,513 | A | 4/1918 | Bem |

(Continued)

FOREIGN PATENT DOCUMENTS

| | | |
|---|---|---|
| EP | 2915681 A1 | 9/2015 |
| EP | 3056354 A1 | 8/2016 |

(Continued)

OTHER PUBLICATIONS

International Search Report for PCT/JP2014/078392 dated Jan. 27, 2015.

*Primary Examiner* — Jason R Bellinger
(74) *Attorney, Agent, or Firm* — Sughrue Mion, PLLC

(57) ABSTRACT

Provided is a non-pneumatic tire in which a plurality of curved sections (21*d*) to (21 f) and (22*d*) to (22*f*) curved inward in a tire circumferential direction are formed at elastic connecting plates (21) and (22) in an extension direction in which the elastic connecting plates (21) and (22) extend when seen in a tire side view such that curved directions are alternately opposite to each other in the extension direction, outer curved sections (21*e*) and (22*e*), inner curved sections (21*d*) and (22*d*), and extension sections (21*i*) (22*i*) extending throughout both of the curved sections and in which inflection sections (21*g*) and (22*g*) formed between both of the curved sections are disposed, are formed at the elastic connecting plates (21) and (22), and the extension sections (21*i*) and (22*i*) extend along reference lines having radii of curvature larger than that of the outer curved sections (21*e*) and (22*e*) and the inner curved sections (21*d*) and (22*d*) when seen in the tire side view and extend from first end portions (21*a*) and (22*a*) of the elastic connecting plates (21) and (22) connected to an outer tubular body (13) to arrive at a central portion in at least the extension direction.

1 Claim, 8 Drawing Sheets

(51) Int. Cl.
  *B60B 9/04* (2006.01)
  *B60B 9/26* (2006.01)
  *B60B 9/08* (2006.01)
  *B60B 5/02* (2006.01)
  *B60C 7/10* (2006.01)

(52) U.S. Cl.
  CPC . *B60B 5/02* (2013.01); *B60B 9/08* (2013.01); *B60B 2360/30* (2013.01); *B60B 2900/111* (2013.01); *B60C 2007/107* (2013.01); *B60C 2007/146* (2013.01)

(56) References Cited

U.S. PATENT DOCUMENTS

| | | | | |
|---|---|---|---|---|
| 9,511,625 | B2* | 12/2016 | Nishida | B60B 9/04 |
| 9,550,393 | B2* | 1/2017 | Abe | B60C 7/18 |
| 9,616,703 | B2* | 4/2017 | Nishida | B60B 9/04 |
| 9,713,940 | B2* | 7/2017 | Nishida | B60C 7/16 |
| 9,902,202 | B2* | 2/2018 | Shoji | B60C 7/14 |
| 2011/0126948 | A1 | 6/2011 | Boyer et al. | |
| 2014/0251518 | A1* | 9/2014 | Abe | B60B 9/04 152/75 |
| 2015/0273946 | A1* | 10/2015 | Abe | B60C 7/18 152/316 |
| 2016/0193876 | A1* | 7/2016 | Kyo | B60B 9/04 152/84 |
| 2016/0236514 | A1* | 8/2016 | Abe | B60C 7/18 |
| 2017/0015141 | A1* | 1/2017 | Shoji | B60C 7/18 |
| 2017/0120680 | A1* | 5/2017 | Takahashi | B60C 7/14 |
| 2017/0136814 | A1* | 5/2017 | Abe | B60B 9/04 |
| 2017/0253084 | A1* | 9/2017 | Takahashi | B60C 7/26 |
| 2017/0305195 | A1* | 10/2017 | Takahashi | B60C 7/14 |
| 2018/0056720 | A1* | 3/2018 | Abe | B60C 7/24 |

FOREIGN PATENT DOCUMENTS

| | | |
|---|---|---|
| JP | 2011-156906 A | 8/2011 |
| JP | 2013-086712 A | 5/2013 |
| JP | 2013-163520 A | 8/2013 |
| JP | 2013-199274 A | 10/2013 |

* cited by examiner

NON-PNEUMATIC TIRE

CROSS REFERENCE TO RELATED APPLICATIONS

This application is a National Stage of International Application No. PCT/JP2014/078392 filed Oct. 14, 2014, claiming priority based on Japanese Patent Application No. 2013-236914, filed Nov. 15, 2013, the contents of all of which are incorporated herein by reference in their entirety.

TECHNICAL FIELD

The present invention relates to a non-pneumatic tire that can be used without being filled with pressurized air.

Priority is claimed on Japanese Patent Application No. 2013-236914, filed Nov. 15, 2013, the content of which is incorporated herein by reference.

BACKGROUND ART

In the pneumatic tire of the related art that is filled with pressurized air and used, the occurrence of a blowout is a structurally unavoidable problem.

In order to solve this problem, in recent years, for example, as disclosed in the following Patent Document 1, a non-pneumatic tire including an attachment body attached to an axle, an outer tubular body configured to surround the attachment body from the outside in a tire radial direction, and a connecting member configured to connect the attachment body and the outer tubular body while allowing displacement therebetween has been proposed. The connecting member is provided with an elastic connecting plate having two end portions, wherein a first end portion is connected to the attachment body and the first end portion is connected to the outer tubular body.

DOCUMENT OF RELATED ART

Patent Document

[Patent Document 1]
Japanese Unexamined Patent Application, First Publication No. 2013-86712

SUMMARY OF INVENTION

Technical Problem

In the non-pneumatic tire of the related art, an elastic connecting plate extends in a tire circumferential direction from an outer tubular body toward the inside in a tire radial direction. For this reason, when the compressive load in the tire radial direction is applied to the non-pneumatic tire, a load is likely to be concentrated to an outer tube-side portion of the elastic connecting plate, i.e., a portion from a first end portion connected to the outer tubular body to a central portion in an extension direction of the elastic connecting plate in the elastic connecting plate.

Here, in order to secure strength of the connecting member, for example, it is considered to increase bending rigidity in the tire radial direction of the outer tube-side portion by forming a thick portion at the above-mentioned outer tube-side portion, and so on. However, in this case, the weight of the non-pneumatic tire may be increased.

In consideration of the above-mentioned circumstances, the present invention is directed to provide a non-pneumatic tire capable of achieving a reduction in weight while limiting a decrease in strength of a connecting member.

Solution to Problem

A non-pneumatic tire according to the present invention includes an attachment body attached to an axle; an outer tubular body configured to surround the attachment body from the outside in a tire radial direction; and connecting members configured to connect the attachment body and the outer tubular body while allowing a displacement therebetween, the connecting members including elastic connecting plates having both ends connected to the attachment body and the outer tubular body and extending from the outer tubular body in a tire circumferential direction toward the inside in the tire radial direction, wherein a plurality of curved sections curved in the tire circumferential direction are formed at the elastic connecting plates in an extension direction in which the elastic connecting plates extend in a tire side view when the non-pneumatic tire is seen from a tire width direction such that curved directions are alternately opposite to each other in the extension direction, outer curved sections disposed closest to the outer tubular body side in the extension direction and inner curved sections neighboring the outer curved sections in the extension direction among the plurality of curved sections, and extension sections extending throughout all of the curved sections and in which inflection sections formed between all of the curved section are disposed, are formed at the elastic connecting plates, and the extension sections extend along reference lines having radii of curvatures larger than that of the outer curved sections and the inner curved sections in the tire side view, and extend from first end portions of the elastic connecting plates connected to the outer tubular body to arrive at a central portion in at least the extension direction.

According to the present invention, the inflection sections of the elastic connecting plates in which the curved directions of all of the curved sections are switched in opposite directions are disposed at the extension sections. Here, a plurality of curved sections are formed such that the curved directions are alternately opposite to each other in the extension direction. For this reason, when a compressive load in the tire radial direction is applied to the non-pneumatic tire, the inflection sections cannot be easily deformed but are mainly displaced. Accordingly, the loads applied to the extension sections serving as a portion of the elastic connecting plates in which the inflection sections are disposed can be limited in comparison with other portions. Then, since the extension sections extend from the first end portions of the elastic connecting plates to arrive at the central portion in at least the extension direction and are installed at an outer tube-side portion of the elastic connecting plates, when the compressive load in the tire radial direction is applied to the non-pneumatic tire, concentration of the load to the outer tube-side portion of the elastic connecting plates can be limited.

Moreover, since the extension sections extend along the reference lines having radii of curvature larger than the outer curved sections and the inner curved sections when seen in the tire side view, the bending rigidity in the tire radial direction of the outer tube-side portion of the elastic connecting plates can be increased based on the shape of the extension sections, for example, even when there is no thick portion formed at the outer tube-side portion, or the like.

Accordingly, since concentration of the load to the outer tube-side portion of the elastic connecting plates can be limited and bending rigidity of the outer tube-side portion can be increased based on the shape of the extension sections, a reduction in weight can be achieved while limiting a decrease in strength of the connecting members. Further, since the extension sections extend along the reference lines having radii of curvature larger than that of the outer curved sections and the inner curved sections when seen in the tire side view, the size in the extension direction of the elastic connecting plates can be reduced and the reduction in weight of the non-pneumatic tire can be reliably achieved.

Further, when the plurality of connecting members are formed in the tire circumferential direction, as the extension sections extend from the first end portions of the elastic connecting plate to arrive at the central portion in at least the extension direction, intervals of connecting members neighboring in the tire circumferential direction between the outer tube-side portions of the elastic connecting plates can be easily held to be equal throughout a length in the extension direction. In addition, when the compressive load in the tire radial direction is applied to the non-pneumatic tire and the connecting members are compressed and deformed, elastic connecting plates neighboring in the tire circumferential direction can be limited from coming in contact with each other.

In addition, lateral cross-sectional areas of the inflection sections may be smaller than lateral cross-sectional areas of other portions of the elastic connecting plates.

In this case, as described above, when the compressive load in the tire radial direction is applied to the non-pneumatic tire of the application, the inflection sections cannot be easily deformed but are mainly displaced, and the lateral cross-sectional areas of the inflection sections are smaller than the lateral cross-sectional areas of the other portions of the elastic connecting plates except for the inflection sections. For this reason, a further reduction in weight can be achieved while limiting a decrease in strength of the connecting members.

In addition, the lateral cross-sectional areas of the elastic connecting plates may be gradually reduced toward the inflection sections in the extension direction.

In this case, a reduction in weight can be effectively achieved while limiting a generation of a place at which stress is concentrated to the elastic connecting plates.

In addition, at least one of sizes in the tire width direction and sizes in the tire circumferential direction of the inflection sections in the elastic connecting plates may be smaller than other portions.

In this case, the non-pneumatic tire that exhibits the above-mentioned effects can be reliably obtained.

Effects of Invention

According to the present invention, a reduction in weight can be achieved while limiting a decrease in strength of the connecting member.

DESCRIPTION OF EMBODIMENTS

Figure 1:
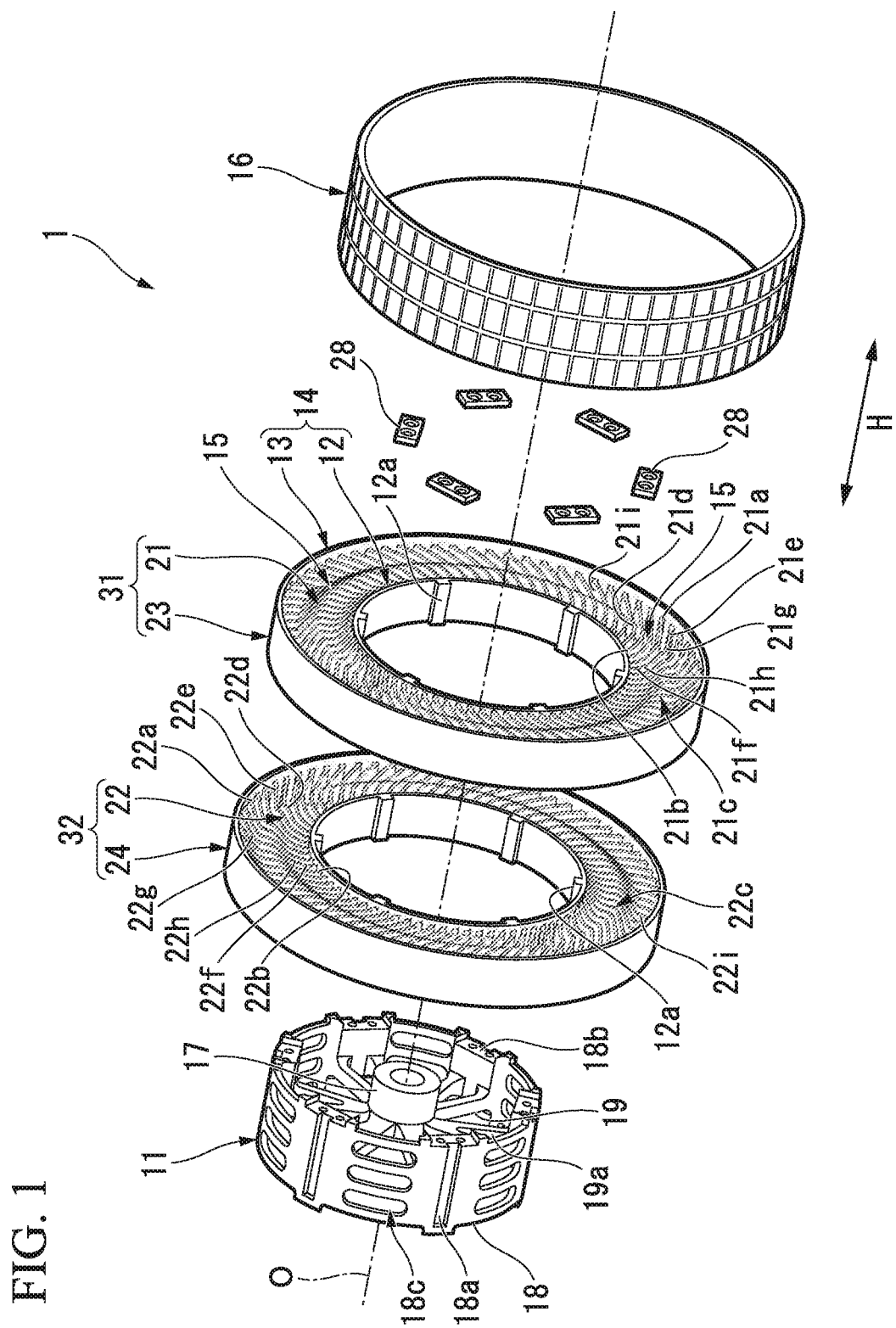
FIG. 1 is an exploded schematic perspective view showing a portion of a non-pneumatic tire of an embodiment according to the present invention.

Hereinafter, an embodiment of a non-pneumatic tire according to the present invention will be described with reference to FIGS. 1 to 6.

A non-pneumatic tire 1 includes an attachment body 11 attached to an axle (not shown), a ring member 14 including an inner tubular body 12 fitted onto the attachment body 11 and an outer tubular body 13 configured to surround the inner tubular body 12 from the outside in a tire radial direction, a plurality of connecting members 15 disposed between the inner tubular body 12 and the outer tubular body 13 in a tire circumferential direction and connecting the tubular bodies 12 and 13 to each other while allowing relative elastic displacement therebetween, and a tread member 16 disposed at an outer circumferential surface side of the outer tubular body 13 throughout the circumference.

Here, the attachment body 11, the inner tubular body 12, the outer tubular body 13 and the tread member 16 are disposed coaxially with a common axis. Hereinafter, the common axis is referred to as an axis O, a direction along the axis O is referred to as a tire width direction H, a direction perpendicular to the axis O is referred to as a tire radial direction, and a direction around the axis O is referred to as the tire circumferential direction. Further, the attachment body 11, the inner tubular body 12, the outer tubular body 13 and the tread member 16 are disposed such that central portions thereof in the tire width direction H coincide with each other.

In the ring member 14, a size in the tire width direction H, i.e., a width, of the outer tubular body 13, is larger than that of the inner tubular body 12. In addition, a plurality of protrusion sections 12a protruding inward in the tire radial direction and extending throughout the length in the tire width direction H are formed at an inner circumferential surface of the inner tubular body 12 at intervals in the tire circumferential direction.

Figure 2:
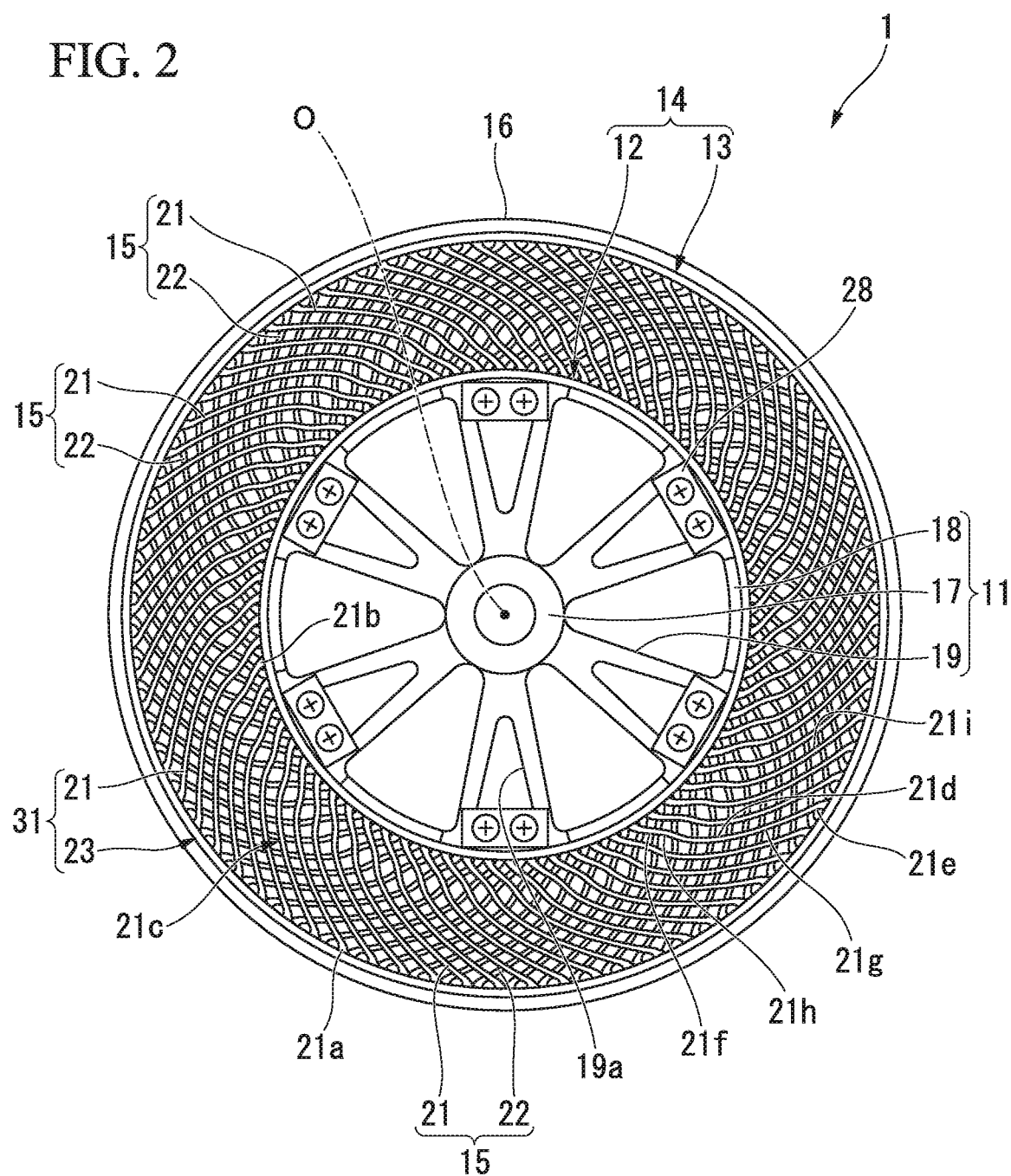
FIG. 2 is a side view of the non-pneumatic tire shown in FIG. 1 when seen from first side in a tire width direction.

As shown in FIGS. 1 and 2, the attachment body 11 includes a mounting tubular section 17 on which a front end portion of the axle is mounted, an outer ring section 18 configured to surround the mounting tubular section 17 from the outside in the tire radial direction, and a plurality of ribs 19 configured to connect the mounting tubular section 17 and the outer ring section 18.

The mounting tubular section 17, the outer ring section 18 and the ribs 19 are integrally formed of a metal material such as an aluminum alloy or the like. The mounting tubular section 17 and the outer ring section 18 are cylindrically formed and disposed coaxially with the axis O. The plurality of ribs 19 are disposed at equal intervals in the tire circumferential direction.

A plurality of key groove sections 18a recessed inward in the tire radial direction and extending in the tire width direction H are formed at an outer circumferential surface of the outer ring section 18 at intervals in the tire circumferential direction. In the outer circumferential surface of the outer ring section 18, each of the key groove sections 18a is open at only first side out of both ends in the tire width direction H and closed at the second side. The protrusion sections 12a of the inner tubular body 12 in the ring member 14 are fitted into the key groove sections 18a.

Further, among wall surfaces that define the key groove sections 18a, pairs of side wall surfaces opposite to each other in the tire circumferential direction are perpendicular to bottom wall surfaces. In addition, among outer surfaces of the protrusion sections 12a, pairs of side wall surfaces rising from the inner circumferential surface of the inner tubular body 12 are perpendicular to top wall surfaces directed inward in the tire radial direction. Sizes in the tire circumferential direction of the protrusion sections 12a and the key groove sections 18a are equal to each other.

Here, concave sections 18b recessed toward the second side of the tire width direction H and into which plate members 28 are fitted are formed at positions of edges of first side in the tire width direction H in the outer ring section 18 corresponding to the key groove sections 18a. Through-holes are formed in the plate members 28, and among wall surfaces that define the concave sections 18b, female screw sections in communication with the through-holes of the plate members 28 fitted into the concave sections 18b are formed in the wall surfaces directed toward first side in the tire width direction H. Further, the plurality of female screw sections and through-holes are formed at intervals in the tire circumferential direction.

Then, the ring member 14 is fixed to the attachment body 11 by screwing bolts into the female screw sections through the through-holes of the plate members 28 fitted into the concave sections 18b in a state in which the inner tubular body 12 is fitted onto the attachment body 11 and the protrusion sections 12a are fitted into the key groove sections 18a. In this state, the protrusion sections 12a are sandwiched between the plate members 28 and the other end wall surfaces disposed at the other end in the tire width direction H and directed toward the first side, among the wall surfaces that define the key groove sections 18a, in the tire width direction H.

Further, a plurality of hole arrays 18c, in each of which a plurality of weight-reduction holes passing in the tire radial direction are disposed at intervals in the tire width direction H, are formed in the tire circumferential direction at intervals at portions of the outer ring section 18 disposed between the key groove sections 18a neighboring in the tire circumferential direction. In addition, weight-reduction holes 19a passing in the tire width direction H are also formed in the ribs 19.

The tread member 16 is formed in a cylindrical shape and integrally covers on the outer circumferential surface of the outer tubular body 13 of the ring member 14 throughout the region. The tread member 16 is formed of, for example, vulcanized rubber in which natural rubber and/or a rubber composition are vulcanized, a thermoplastic material, or the like. For example, a thermoplastic elastomer, a thermoplastic resin, or the like, is an exemplary example of the thermoplastic material. For example, an amide-based thermoplastic elastomer (TPA), an ester-based thermoplastic elastomer (TPC), an olefin-based thermoplastic elastomer (TPO), a styrene-based thermoplastic elastomer (TPS), a urethane-based thermoplastic elastomer (TPU), a thermoplastic rubber crosslinked body (TPV), another thermoplastic elastomer (TPZ), or the like, as defined in Japanese Industrial Standard JIS K6418, is an exemplary example of the thermoplastic elastomer. For example, a urethane resin, an olefin resin, polyvinyl chloride, a polyamide resin, or the like, is an exemplary example of the thermoplastic resin. Further, in view of abrasion resistance, the tread member 16 may be formed of vulcanized rubber.

The connecting members 15 connect the attachment body 11 and the outer tubular body 13 while allowing relative elastic displacement therebetween.

The connecting members 15 are connected to the attachment body 11 via the inner tubular body 12. The connecting members 15 include first elastic connecting plates 21 and second elastic connecting plates 22 that are configured to connect the inner tubular body 12 and the outer tubular body 13 of the ring member 14 to each other.

The plurality of (in the example shown, 60) connecting members 15 are formed in the tire circumferential direction such that a plurality of first elastic connecting plates 21 are disposed in the tire circumferential direction at predetermined positions in the tire width direction H and a plurality of second elastic connecting plates 22 are disposed in the tire circumferential direction at other positions in the tire width direction H different from the predetermined positions in the tire width direction H.

That is, the plurality of first elastic connecting plates 21 are disposed in the tire circumferential direction at the same positions in the tire width direction H, and the plurality of second elastic connecting plates 22 are disposed in the tire circumferential direction at the same predetermined positions in the tire width direction H spaced apart from the first elastic connecting plates 21 in the tire width direction H.

Further, the plurality of connecting members 15 are disposed between the inner tubular body 12 and the outer tubular body 13 of the ring member 14 at positions that are axially symmetrical with respect to the axis O. In addition, all of the connecting members 15 have the same shape and the same size. Further, a width of the connecting members 15 is smaller than that of the outer tubular body 13.

Additionally, the first elastic connecting plates 21 neighboring in the tire circumferential direction do not come in contact with each other, and the second elastic connecting plates 22 neighboring in the tire circumferential direction do not come in contact with each other either. Further, the first elastic connecting plates 21 and the second elastic connecting plates 22 neighboring them in the tire width direction H do not come in contact with each other either.

Further, widths of the first elastic connecting plates 21 and the second elastic connecting plates 22 are equal to each other. In addition, thicknesses of the first elastic connecting plates 21 and the second elastic connecting plates 22 are also equal to each other.

Here, first end portions 21a of the first elastic connecting plates 21 connected to the outer tubular body 13 are disposed closer to a first side in the tire circumferential direction than the second end portions 21b connected to the inner tubular body 12, and first end portions 22a of the second elastic connecting plates 22 connected to the outer tubular body 13 are disposed closer to the second side in the tire circumferential direction than the second end portions 22b connected to the inner tubular body 12.

In addition, the first end portions 21a and 22a of the first elastic connecting plate 21 and the second elastic connecting plate 22 in each of the connecting members 15 are disposed at different positions in the tire width direction H and connected to the same position in the tire circumferential direction on the inner circumferential surface of the outer tubular body 13.

In each of the first elastic connecting plates 21 and the second elastic connecting plates 22, a plurality of curved sections 21d to 21f and 22d to 22f curved in the tire circumferential direction are formed at intermediate portions 21c and 22c disposed between the first end portions 21a and 22a and the second end portions 21b and 22b in an extension direction in which the elastic connecting plates 21 and 22 extend, in a tire side view when the tire 1 is seen from the tire width direction H. Further, the curved sections 21d to 21f and 22d to 22f are respectively portions of the first and second elastic connecting plates 21 and 22 having curvatures when seen in the tire side view.

In both types of the elastic connecting plates 21 and 22, among the plurality of curved sections 21d to 21f and 22d to 22f, curved directions of the curved sections 21d to 21f and 22d to 22f neighboring in the extension direction are directed in opposite directions, and the plurality of curved sections 21d to 21f and 22d to 22f are disposed such that curved directions thereof are alternately directed in opposite directions in the extension direction.

Further, a configuration in which the curved sections 21d to 21f and 22d to 22f are adjacent to each other in the extension direction includes a configuration in which the curved direction are opposite to each other and two curved sections parallel to the extension direction approach each other in the extension direction, a configuration in which the curved sections are largely spaced from each other in the extension direction, or the like.

The plurality of curved sections 21d to 21f formed in the first elastic connecting plates 21 have first curved sections (inner curved sections) 21d curved to protrude toward the second side in the tire circumferential direction, second curved sections (outer curved sections) 21e disposed between the first curved sections 21d and the first end portions 21a and curved to protrude toward a first side in the tire circumferential direction, and third curved sections 21f disposed between the first curved sections 21d and the second end portions 21b and curved to protrude toward the first side in the tire circumferential direction.

The plurality of curved sections 22d to 22f formed in the second elastic connecting plates 22 have first curved sections (inner curved sections) 22d curved to protrude toward the first side in the tire circumferential direction, second curved sections (outer curved sections) 22e disposed between the first curved sections 22d and the first end portions 22a and curved to protrude toward the second side in the tire circumferential direction, and third curved sections 22f disposed between the first curved sections 22d and the second end portions 22b and curved to protrude toward the second side in the tire circumferential direction.

In the example shown, the first curved sections 21d and 22d have larger radii of curvature in the tire side view than the second curved sections 21e and 22e and the third curved sections 21f and 22f. Further, the first curved sections 21d and 22d are disposed at central portions in the extension direction of the first elastic connecting plates 21 and the second elastic connecting plates 22.

Further, lengths of both types of the elastic connecting plates 21 and 22 are equal to each other, and the second end portions 21b and 22b of both types of the elastic connecting plates 21 and 22 are connected to positions spaced apart by the same angle (for example, 20° to 135°) from the positions opposite to the first end portions 21a and 22a in the tire radial direction at the first side and the second side on the outer circumferential surface of the inner tubular body 12 in the tire circumferential direction around the axis O when seen in the tire side view. In addition, the first curved sections 21d and 22d, the second curved sections 21e and 22e, and the third curved sections 21f and 22f of the first elastic connecting plates 21 and the second elastic connecting plates 22 are directed to protrude in opposite directions in the tire circumferential direction and have the same size.

Figure 4:
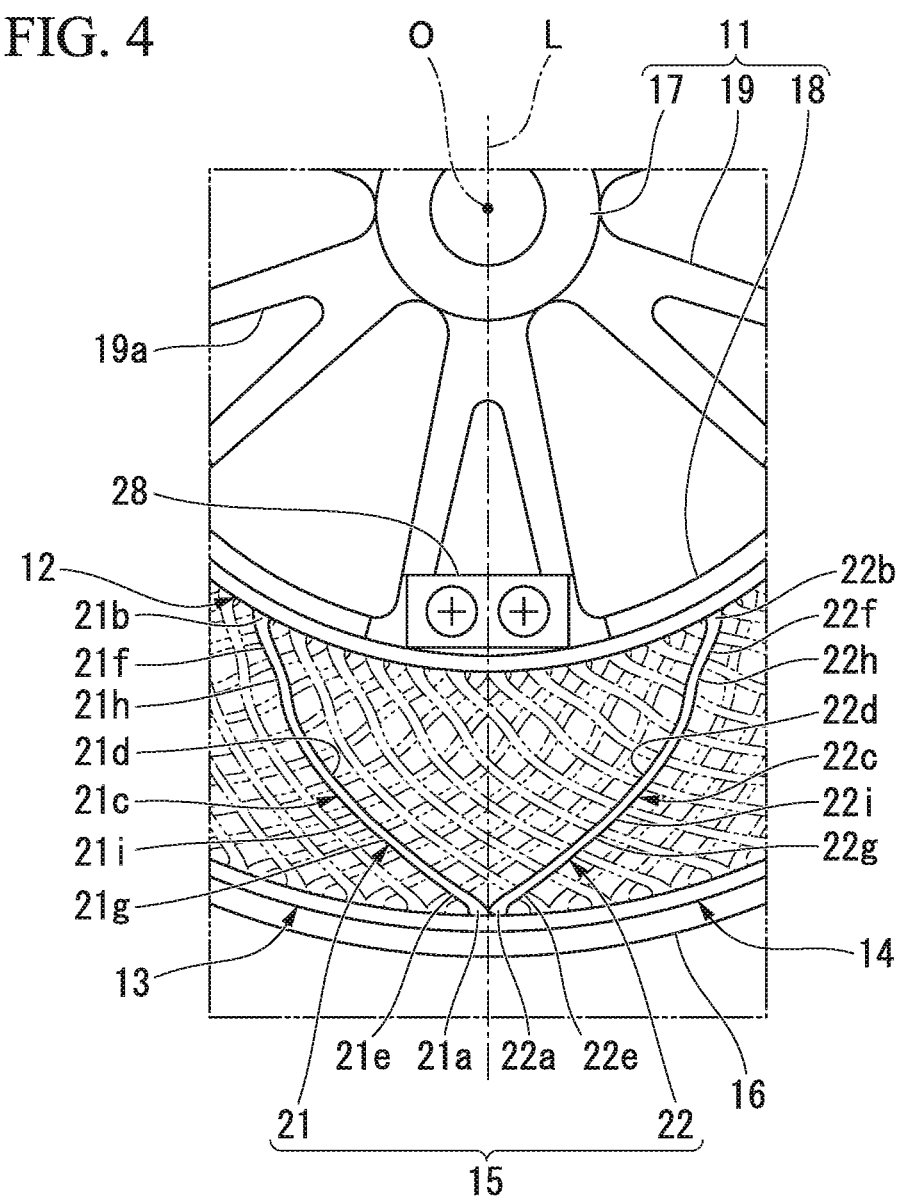
FIG. 4 is an enlarged view showing a major part of FIG. 2.

Accordingly, as shown in FIG. 4, a shape in the tire side view of each of the connecting members 15 is linearly symmetrical with respect to an imaginary line L extending in the tire radial direction and passing through the first end portions 21a and 22a of both types of the elastic connecting plates 21 and 22.

Additionally, in the embodiment, in both types of the elastic connecting plates 21 and 22, an area of a lateral cross section of inflection sections 21g, 21h, 22g and 22h disposed between curved sections 21d to 21f and 22d to 22f neighboring in the extension direction perpendicular to the extension direction, i.e., a lateral cross-sectional area, is smaller than that of the other portions. Further, the inflection sections 21g, 21h, 22g and 22h of both types of the elastic connecting plates 21 and 22 are boundary regions of the curved sections 21d to 21f and 22d to 22f neighboring in the extension direction, and are regions in which curved directions of the curved sections 21d to 21f and 22d to 22f neighboring each other are switched when seen in the tire side view.

In the example shown, lateral cross-sectional areas of both types of the elastic connecting plates 21 and 22 are gradually reduced toward the inflection sections 21g, 21h, 22g and 22h in the extension direction.

In addition, in both types of the elastic connecting plates 21 and 22, sizes of the inflection sections 21g, 21h, 22g and 22h in both the tire width direction H and the tire circumferential direction are smaller than those of other portions.

Figure 6A:
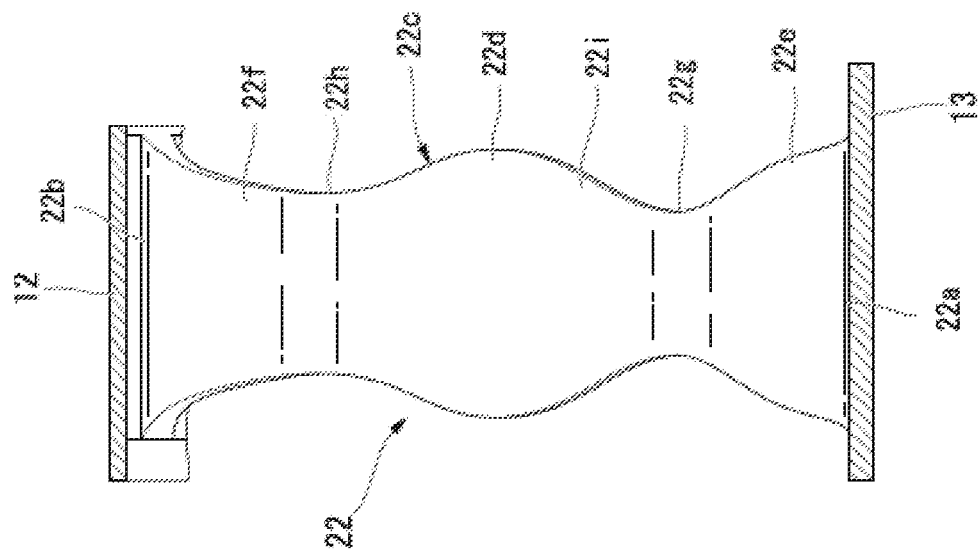
FIG. 6A and FIG. 6B are plan views showing a portion of the first split case body of FIG. 5A when seen from the second side in a tire circumferential direction, and showing a portion of the second split case body of FIG. 5B when seen from the first side in the tire circumferential direction.
Figure 6B:
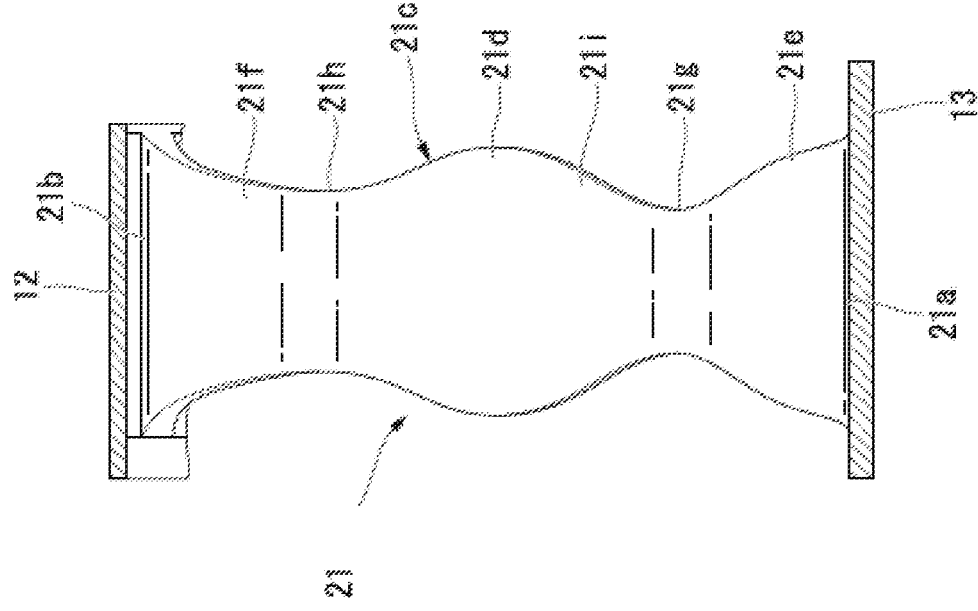

As shown in FIG. 6A and FIG. 6B, in both types of the elastic connecting plates 21 and 22, both edges in the tire width direction H are bent in the tire width direction H to gradually approach each other toward the inflection sections 21g, 21h, 22g and 22h in the extension direction. In addition, both of the edges in the tire width direction H of both types of the elastic connecting plates 21 and 22 are formed in curved shapes that continuously extend without corners or stepped sections throughout the length in the extension direction. Further, only one of the two edges in the tire width direction H in both types of the elastic connecting plates 21 and 22 may be formed in the curved shapes as described above.

Sizes in the tire width direction H of both types of the elastic connecting plates 21 and 22 are gradually reduced toward the inflection sections 21g, 21h, 22g and 22h from the first end portions 21a and 22a and the second end portions 21b and 22b, and are gradually reduced from centers in the extension direction of the first curved sections 21d and 22d toward the inflection sections 21g, 21h, 22g and 22h. In addition, sizes in the tire width direction H of both types of the elastic connecting plates 21 and 22 are equal to each other in the centers of the extension direction of the first end portions 21a and 22a, the second end portions 21b and 22b, and the first curved sections 21d and 22d.

Figure 5B:
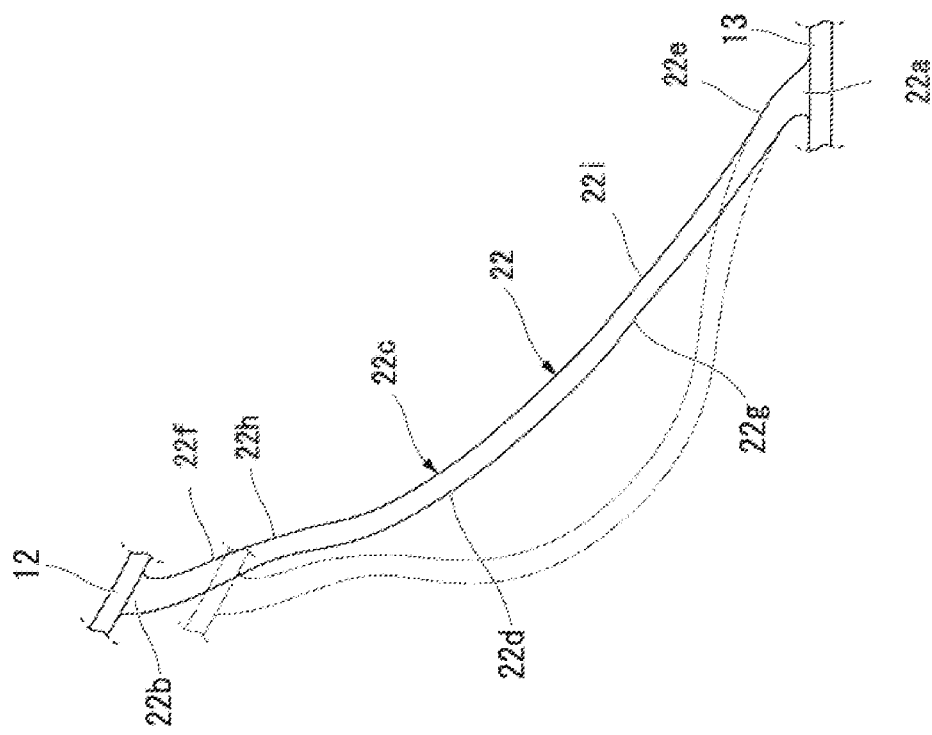
FIG. 5A and FIG. 5B are enlarged views showing portions of the first and second split case bodies.
Figure 5A:
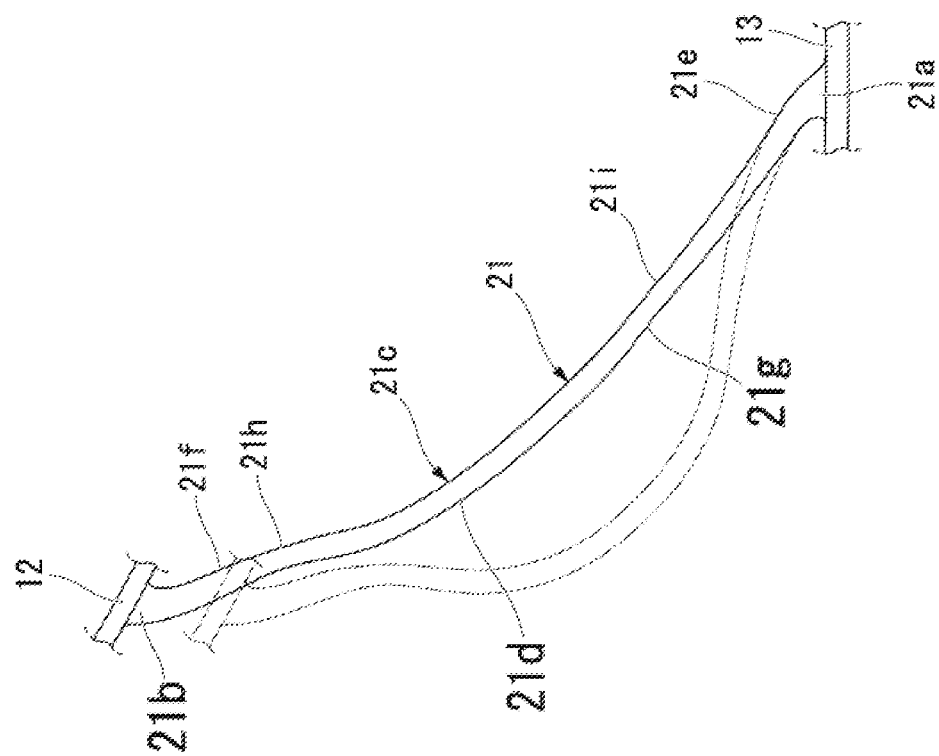

As shown in FIG. 5A and FIG. 5B, in both types of the elastic connecting plates 21 and 22, sizes in the tire circumferential direction, i.e., thicknesses of the inflection sections 21g, 21h, 22g and 22h, are smallest. In both types of the elastic connecting plates 21 and 22, the thickness of each of the first end portions 21a and 22a and the second end portions 21b and 22b is largest, and then the thicknesses of the first curved sections 21d and 22d are the second largest.

The first to third the curved sections 21d to 21f and 22d to 22f and the inflection sections 21g, 21h, 22g and 22h are smoothly connected in the extension direction without corners or stepped sections in the tire side view.

Here, as shown in FIG. 5A and FIG. 5B, extension sections 21i and 22i are formed at the elastic connecting plates 21 and 22. The second curved sections 21e and 22e serving as the curved sections disposed closest to the outer tubular body 13 side in the extension direction and first curved sections 21d and 22d serving as the curved sections disposed at the attachment body 11 side in the extension direction with respect to the second curved sections 21e and 22e and neighboring in the extension direction of the second curved sections 21e and 22e, among the plurality of curved sections 21d to 21f and 22d to 22f, and the inflection sections 21g and 22g extending throughout all of the curved sections 21d, 21e, 22d and 22e and provided between the curved sections 21d, 21e, 22d and 22e are disposed at the extension sections 21i and 22i.

The extension sections 21i and 22i extend along reference lines (not shown) having radii of curvature larger than that of the first curved sections 21d and 22d and the second curved sections 21e and 22e when seen in the tire side view. In the example shown, the reference lines are arc lines having a single curvature having a slightly outwardly convex shape in the tire radial direction, and pass a central portion in the extension direction of the first curved sections 21d and 22d and a central portion in the extension direction of the second curved sections 21e and 22e to connect both of the central portions. The extension sections 21i and 22i form a slightly outwardly convex shape in the tire radial direction as a whole and extend in a substantially linear shape when seen in the tire side view. Further, the reference line may be appropriately modified to another shape having a single curvature, for example, it may employ a straight line having an infinite radius of curvature, as the reference line.

In the embodiment, the extension sections 21i and 22i extend from the first end portions 21a and 22a of the elastic connecting plates 21 and 22 to arrive at the central portions in at least in the extension direction. End portions of the attachment body 11 side in the extension direction of the extension sections 21i and 22i are disposed closer to the attachment body 11 side than centers in the extension direction of the elastic connecting plates 21 and 22, and the extension sections 21i and 22i extend from the first end portions 21a and 22a of the elastic connecting plates 21 and 22 to arrive at positions closer to the attachment body 11 side than the centers in the extension direction. The extension sections 21i and 22i extend from the first end portions 21a in the tire circumferential direction while being directed inward in the tire radial direction.

In the example shown, the extension sections 21i and 22i are formed to connect the centers in the extension direction of the second curved sections 21e and 22e and the centers in the extension direction of the first curved sections 21d and 22d. The extension sections 21i and 22i are constituted by portions of the second curved sections 21e and 22e disposed closer to the attachment body 11 side than the centers, portions of the first curved sections 21d and 22d disposed closer to the outer tubular body 13 side than the centers, and the inflection sections 21g and 22g disposed between all of the curved sections 21d, 21e, 22d and 22e.

Further, thicknesses of the extension sections 21i and 22i are smaller than thicknesses of the first end portions 21a and 22a throughout the lengths in the extension direction of the extension sections 21i and 22i.

In addition, as shown in FIG. 4, the extension sections 21i and 22i of the elastic connecting plates 21 and 22 neighboring in the tire circumferential direction face each other in the tire circumferential direction, and an interval in the tire circumferential direction of the extension sections 21i and 22i is constant through the length in the extension direction. In addition, an interval in the tire radial direction of the portions of the extension sections 21i and 22i facing each other in the tire radial direction is also constant throughout the length in the extension direction.

Here, in the embodiment, the ring member 14 and the plurality of connecting members 15 are integrally formed of a synthetic resin material. Further, the synthetic resin material may be only one kind of resin material, a mixture including two or more kinds of resin materials, or a mixture including one or more kinds of resin materials and one or more kinds of elastomers. Further, the synthetic resin material may include additives such as an anti-oxidant, a plasticizing agent, a filler, a pigment, or the like.

Further, in the embodiment, as shown in FIG. 1, the ring member 14 is split into first split ring member 23 disposed at first side in the tire width direction H, and an second split ring member 24 disposed at the second side in the tire width direction H. Further, in the example shown, the ring member 14 is split at a central portion in the tire width direction H.

Additionally, the first split ring member 23 is integrally formed with the first elastic connecting plates 21, and the second split ring member 24 is integrally formed with the second elastic connecting plates 22.

Further, in the embodiment, the first split ring member 23 and the first elastic connecting plates 21 are integrally formed by injection molding, and the second split ring member 24 and the second elastic connecting plates 22 are also integrally formed by injection molding.

Hereinafter, a member formed by integrally forming the first split ring member 23 and the first elastic connecting plates 21 is referred to as a first split case body 31, and a member formed by integrally forming the second split ring member 24 and the second elastic connecting plates 22 is referred to as a second split case body 32.

Here, the injection molding may adopt a general method of simultaneously forming each of the first and second split case bodies 31 and 32 as a whole, may be insert molding in which one of the one and the second split ring members 23 and 24 and one of the first and second elastic connecting plates 21 and 22 are formed as an insert part and the others may be formed of injection molding in each of the first and second split case bodies 31 and 32, or may be so-called two-color formation or the like.

In addition, in each of the first and second split case bodies 31 and 32, the one and the second split ring members 23 and 24 and the first and second elastic connecting plates 21 and 22 may be formed of different materials or may be formed of the same material. Further, the material may be a metal material, a resin material, or the like, or a resin material, in particular, a thermoplastic resin, is preferable in view of a reduction in weight.

Further, when each of the first and second split case bodies 31 and 32 is simultaneously formed by injection molding as a whole, the plurality of protrusion sections 12a formed at the inner tubular body 12 may be a gate portion.

In each of the first and second split case bodies 31 and 32, central portions in the tire width direction H of the first and second elastic connecting plates 21 and 22 coincide with a central portion in the tire width direction H of the outer tubular body 13, and the inner tubular body 12 has a width smaller than that of the outer tubular body 13.

Additionally, edges in the tire width direction H of the outer tubular body 13 of the first split ring member 23 and the outer tubular body 13 of the second split ring member 24 are connected by, for example, welding, fusion, adhesion, or the like. Further, among these, in the case of welding, for example, hot plate welding or the like may be employed.

In addition, edges in the tire width direction H of the inner tubular body 12 of the first split ring member 23 and the inner tubular body 12 of the second split ring member 24 are separated from each other in the tire width direction H. Accordingly, the generation of burrs on the inner circumferential surface of the inner tubular body 12 fitted onto the attachment body 11 is prevented.

Figure 3:
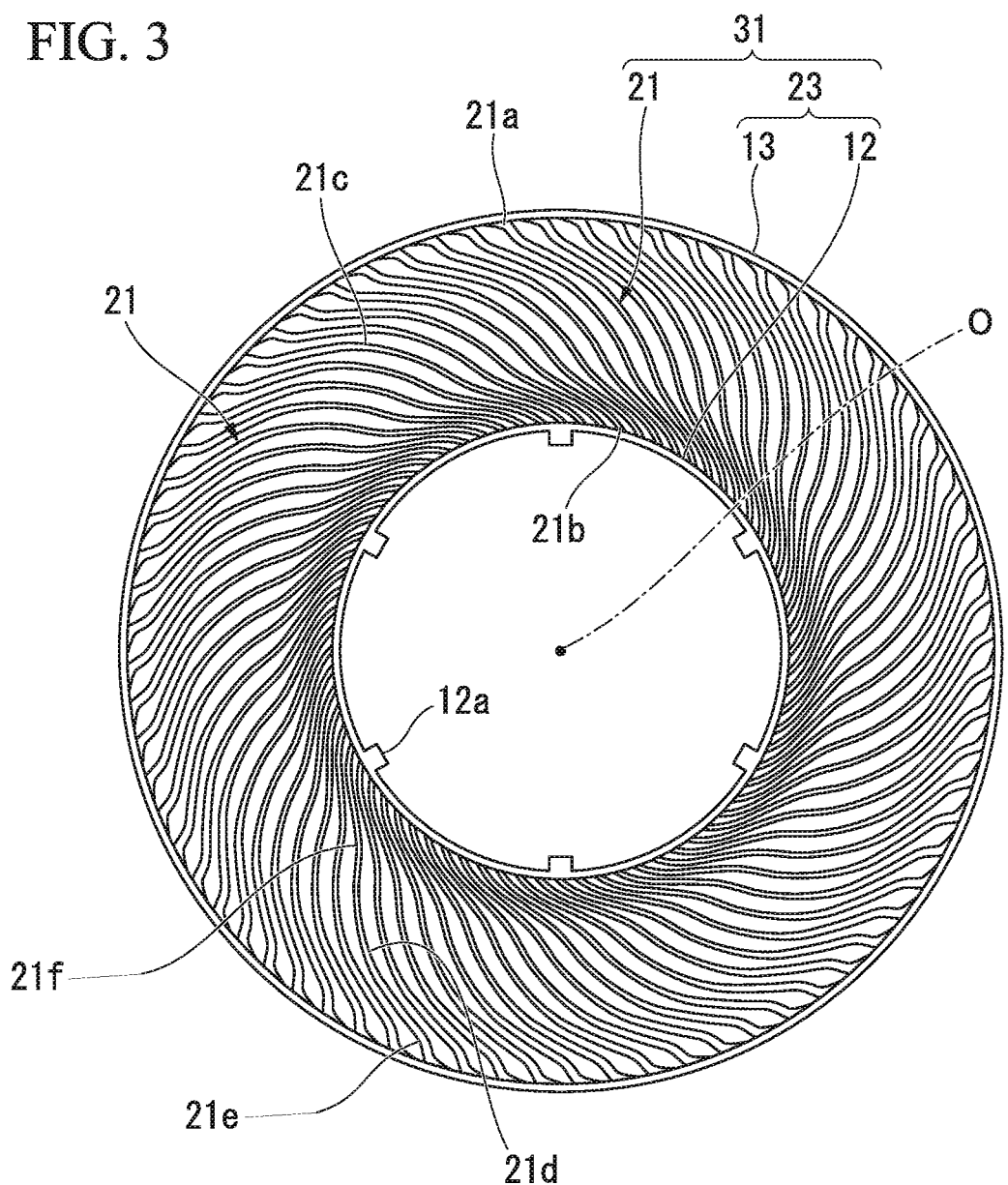
FIG. 3 is a side view of a first split case body when seen from a first side in the tire width direction, or a side view of a second split case body when seen from a second side in the tire width direction, of the non-pneumatic tire shown in FIG. 1.

In addition, the first split case body 31 and the second split case body 32 have the same shape and the same size as shown in FIG. 3 in a state before these case bodies 31 and 32 are connected as described above.

In addition, when they are connected as described above, the non-pneumatic tire 1 is obtained by abutting and connecting the edges in the tire width direction H of the outer tubular bodies 13 of the first split case body 31 and the second split case body 32 such that the connecting members 15 are line-symmetrical as described above in the tire side view when in a state in which orientations in the tire width direction H of both of the split case bodies 31 and 32 are opposite to each other while matching positions in the tire circumferential direction of the first split case body 31 and the second split case body 32.

As described above, according to the non-pneumatic tire 1 of the embodiment, the inflection sections 21g and 22g that are regions of the elastic connecting plates 21 and 22 in which the curved directions of the first curved sections 21d and 22d and the second curved sections 21e and 22e are switched into opposite directions are disposed at the extension sections 21i and 22i. Here, the plurality of curved sections 21d to 21f and 22d to 22f are formed such that the curved directions are alternately directed in opposite directions in the extension direction. For this reason, as shown by a two-dot chain line in FIG. 5A and FIG. 5B, when a compressive load in the tire radial direction is applied to the non-pneumatic tire 1, the inflection sections 21g and 22g are not easily deformed but are mainly displaced, and loads applied to the extension sections 21i and 22i that are positions at which the inflection sections 21g and 22g are disposed can be limited in the elastic connecting plates 21 and 22 more than in other portions. In addition, since the extension sections 21i and 22i extend from the first end portions 21a and 22a of the elastic connecting plates 21 and 22 to arrive at the central portions in at least the extension direction and are formed at outer tube-side portions of the elastic connecting plates 21 and 22, i.e., portions of the elastic connecting plates 21 and 22 ranging from the first end portions 21a and 22a to the central portions, when the compressive load in the tire radial direction is applied to the non-pneumatic tire 1, the concentration of the load to the outer tube-side portions of the elastic connecting plates 21 and 22 can be limited.

Moreover, the extension sections 21i and 22i extend along the reference lines having radii of curvature in the tire side view larger than that of the first curved sections 21d and 22d and the second curved sections 21e and 22e. For this reason, bending rigidity in the tire radial direction of the outer tube-side portions of the elastic connecting plates 21 and 22 can be increased based on shapes of the extension sections 21i and 22i, for example, even without thick portions formed at the outer tube-side portions.

Accordingly, since concentration of the loads applied to the outer tube-side portions of the elastic connecting plates 21 and 22 can be limited and the bending rigidity of the outer tube-side portion can be increased based on the shapes of the extension sections 21i and 22i, a reduction in weight can be achieved while limiting a decrease in strength of the connecting member 15. Further, since the extension sections 21i and 22i extend along the reference lines having the radii of curvature in the tire side view larger than that of the first curved sections 21d and 22d and the second curved sections 21e and 22e, the sizes in the extension direction of the elastic connecting plates 21 and 22 can be reduced, and the reduction in weight of the non-pneumatic tire 1 can be reliably achieved.

Further, like the embodiment, when the plurality of connecting members 15 are formed in the tire circumferential direction, as the extension sections 21i and 22i extend from the first end portions 21a and 22a of the elastic connecting plates 21 and 22 to arrive at the central portions in at least the extension direction, for example, as shown in FIG. 4, intervals of the connecting members 15 neighboring in the tire circumferential direction between the outer tube-side portions of the elastic connecting plates 21 and 22 can be easily held to be equal throughout the length in the extension direction. In addition, when the compressive load in the tire radial direction is applied to the non-pneumatic tire 1 and the connecting member 15 is compressively deformed, the elastic connecting plates 21 and 22 neighboring in the tire circumferential direction can be limited from coming in contact with each other.

In addition, as described above, when the compressive load in the tire radial direction is applied to the non-pneumatic tire 1, the inflection sections 21g and 22g cannot be easily deformed but are mainly displaced, and the lateral cross-sectional areas of the inflection sections 21g, 21h, 22g and 22h are smaller than the other lateral cross-sectional areas of the first and second elastic connecting plates 21 and 22 except for the inflection sections 21g, 21h, 22g and 22h. For this reason, further reduction in weight can be achieved while preventing a decrease in strength of the connecting member 15.

In addition, since the lateral cross-sectional area of each of the first and second elastic connecting plates 21 and 22 is gradually reduced towards each of the inflection sections 21g, 21h, 22g and 22h in the extension direction, the reduction in weight can be effectively achieved while limiting the occurrence of a place at which stress is concentrated in the first and second elastic connecting plates 21 and 22.

In addition, since both of the sizes in the tire width direction H of the first and second elastic connecting plates 21 and 22 and the sizes in the tire circumferential direction are smaller than those of the other portions in the inflection sections 21g, 21h, 22g and 22h, the non-pneumatic tire 1 that exhibits the above-mentioned effects can be reliably obtained.

Further, the technical scope of the present invention is not limited to the embodiment but various modifications may be added without departing from the spirit of the present invention.

For example, in the embodiment, a configuration including one of each of the first elastic connecting plates 21 and the second elastic connecting plates 22 as a single connecting member 15 is shown. However, instead of this, a configuration in which the plurality of first elastic connecting plates 21 and the plurality of second elastic connecting plates 22 are installed in each of the connecting members 15 at different positions in the tire width direction H may be employed.

In addition, the plurality of connecting members 15 may be installed between the inner tubular body 12 and the outer tubular body 13 in the tire width direction H.

In addition, instead of the embodiment, the second end portions 21b and 22b of the first elastic connecting plates 21 and the second elastic connecting plates 22 may be connected to, for example, positions on the outer circumferential surface of the inner tubular body 12 that are opposite to each other with the axis O interposed therebetween in the tire radial direction, or may be connected to positions on the outer circumferential surface of the inner tubular body 12 that are opposite to the first end portions 21a and 22a of the first elastic connecting plates 21 and the second elastic connecting plates 22 in the tire radial direction, or the like.

In addition, instead of the embodiment, the first end portions 21a and 22a of both types of the elastic connecting plates 21 and 22 may be connected to the inner circumferential surface of the outer tubular body 13 at different positions in the tire circumferential direction.

Further, a gap in the tire width direction H may not be provided between the inner tubular body 12 of the first split ring member 23 and the inner tubular body 12 of the second split ring member 24.

In addition, the ring member 14 may be split into three or more parts in the tire width direction H or may not be split.

In addition, the ring member 14 and the plurality of connecting members 15 may not be integrally formed with each other.

Furthermore, the ring member 14 and the connecting members 15 are not limited to the embodiment. For example, an outer tubular body and an attachment body may be directly connected while allowing relative elastic displacement via connecting members without an inner tubular body being provided.

In addition, lateral cross-sectional areas of both types of the elastic connecting plates 21 and 22 may be smaller than those of only the inflection sections 21g, 21h, 22g and 22h of both types of the elastic connecting plates 21 and 22.

In addition, in the embodiment, in each of the elastic connecting plates 21 and 22, while both of the size in the tire width direction H and the size in the tire circumferential direction are smaller than those of the other portions in the inflection sections 21g, 21h, 22g and 22h, only one of these may be smaller.

In addition, in each of the elastic connecting plates 21 and 22, as holes passing in the tire circumferential direction are formed in the inflection sections 21g, 21h, 22g and 22h, the lateral cross-sectional areas of the inflection sections 21g, 21h, 22g and 22h may be smaller than in the other portions.

In addition, the extension sections 21i and 22i are not limited to those shown in the embodiment. For example, concavo-convex sections that are recessed and protruded in the tire radial direction may be alternately formed at the extension sections 21i and 22i.

Further, the components according to the above-mentioned embodiment may be appropriately substituted with known components without departing from the spirit of the present invention, and the above-mentioned variants may be appropriately combined therewith.

In addition, a verification test of the above-mentioned effects was performed.

Figure 7:
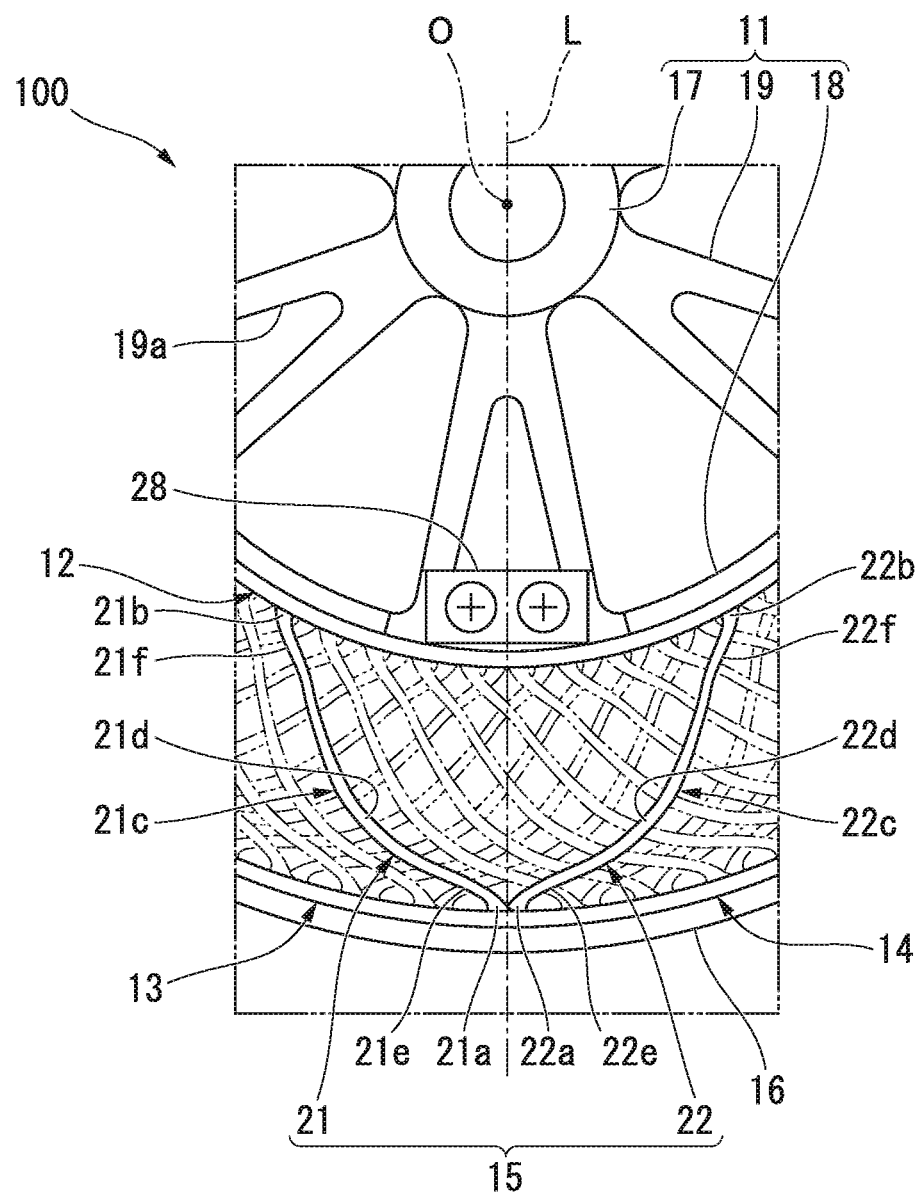
FIG. 7 is an enlarged view showing major parts of first and second split case bodies that constitute a non-pneumatic tire used as a comparative example in a verification test for verifying effects of the present invention.
Figure 8A:
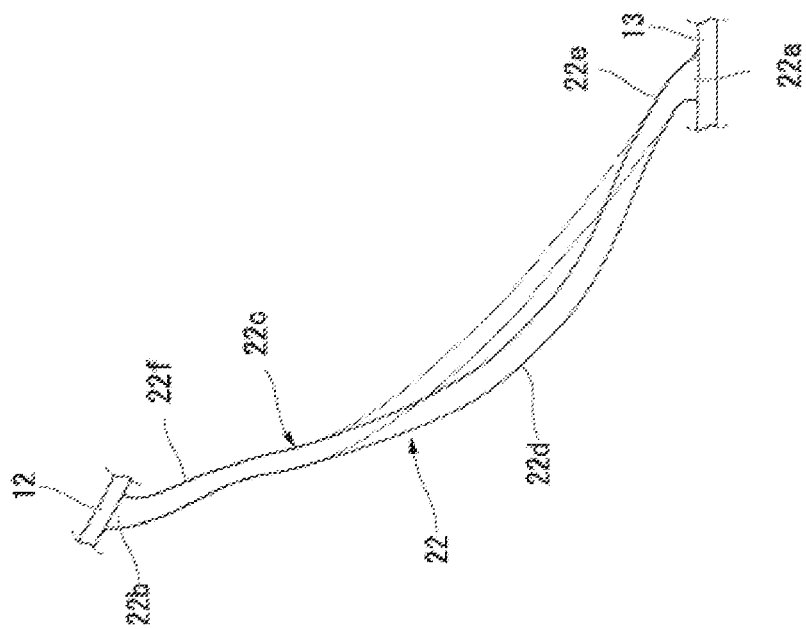
FIG. 8A and FIG. 8B are plan views showing a portion of the first split case body shown in FIG. 7 when seen from a second side in a tire circumferential direction, and showing a portion of the second split case body of FIG. 7 when seen from a first side in the tire circumferential direction.
Figure 8B:
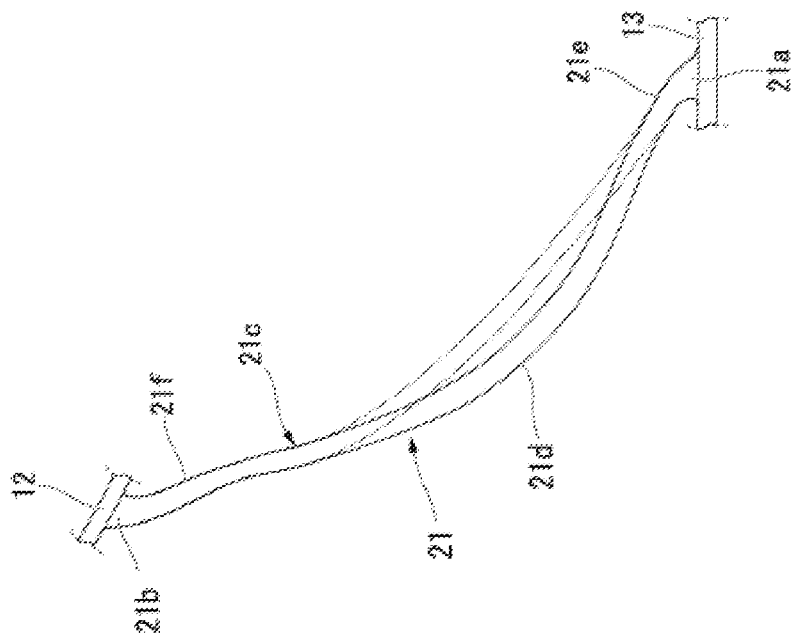

The non-pneumatic tire 1 shown in FIGS. 1 to 6 was employed as an example, and a non-pneumatic tire 100 shown in FIGS. 7 and 8 was employed as a comparative example. In the non-pneumatic tire 100 of a comparative example, first curved sections 21d and 22d extend from first end portions 21a and 22a of elastic connecting plates 21 and 22 to arrive closer to an attachment body 11 than the center in an extension direction, and both elastic connecting plates 21 and 22 are longer in the extension direction than the elastic connecting plates 21 and 22 of the non-pneumatic tire 1 of the example shown by a two-dot chain line in FIG. 8A and FIG. 8B. Further, sizes in a tire width direction H of both of the elastic connecting plates 21 and 22 of the non-pneumatic tire 100 of the comparative example were equal to each other throughout the length in the extension direction.

Sizes of both of the non-pneumatic tires 1 and 100 were 155/65R15.

Then, compressive forces when the two kinds of non-pneumatic tires 1 and 100 were compressed in the tire radial direction and the connecting members 15 were damaged were calculated by numerical analysis.

As a result, it was confirmed that, in comparison with the weight of the non-pneumatic tire 100 of the comparative example, the weight of the non-pneumatic tire 1 of the example was decreased by 10%, and in comparison with the compressive force of the non-pneumatic tire 100 of the comparative example, the compressive force of the non-pneumatic tire 1 of the example was improved by 20%.

INDUSTRIAL APPLICABILITY

According to the non-pneumatic tire of the present invention, it is possible to achieve a reduction in weight while limiting a decrease in strength of the connecting members.

What is claimed is:

1. A non-pneumatic tire comprising:
   an attachment body attached to an axle;
   an outer tubular body located radially outwardly of the attachment body in a tire radial direction; and
   connecting members configured to connect the attachment body and the outer tubular body while allowing a displacement therebetween, wherein:
   the connecting members comprising elastic connecting plates having first ends connected to the attachment body and second ends opposite to the first ends connected to the outer tubular body and extending from the outer tubular body in a tire circumferential direction and in the tire radial direction toward a central portion of the tire;
   each of the elastic connecting plates includes a plurality of curved sections curved in a circumferential direction of the tire and extending in a radial direction of the tire, curved directions of the plurality of curved sections in an axial direction of the tire are alternately opposite with each other along the radial direction;
   the plurality of curved sections include:
   outer curved sections of elastic connecting plates disposed closest to the outer tubular body in the radial direction;

inner curved sections of elastic connecting plates adjacent to the outer curved sections in the radial direction among the plurality of curved sections; and extension sections of elastic connecting plates including inflection sections of the elastic connecting plates formed between the inner and outer curved sections, a radii of curvature of the extension sections is larger than those of the outer curved sections and the inner curved sections in the axial direction, and the extension sections extend from first end portions of the elastic connecting plates connected to the outer tubular body to a central portion of the elastic connecting plates in the radial direction, wherein lateral cross-sectional areas of the inflection sections of the elastic connecting plates are smaller than a lateral cross-sectional area of other portions of the elastic connecting plates, wherein the lateral cross-sectional areas of the elastic connecting plates are reduced toward the inflection sections in the radial direction, and wherein at least one of widths in the axial direction of the tire and thickness in the tire circumferential direction of the inflection sections in the elastic connecting plates are smaller than other portions of the elastic connecting plates.

* * * * *